July 27, 1954

E. O. BLODGETT 2,684,745

TELETYPEWRITER

Filed Nov. 21, 1950

INVENTOR
EDWIN O. BLODGETT
BY Robert S. Dunham
ATTORNEY

July 27, 1954
E. O. BLODGETT
2,684,745
TELETYPEWRITER
Filed Nov. 21, 1950
10 Sheets-Sheet 4
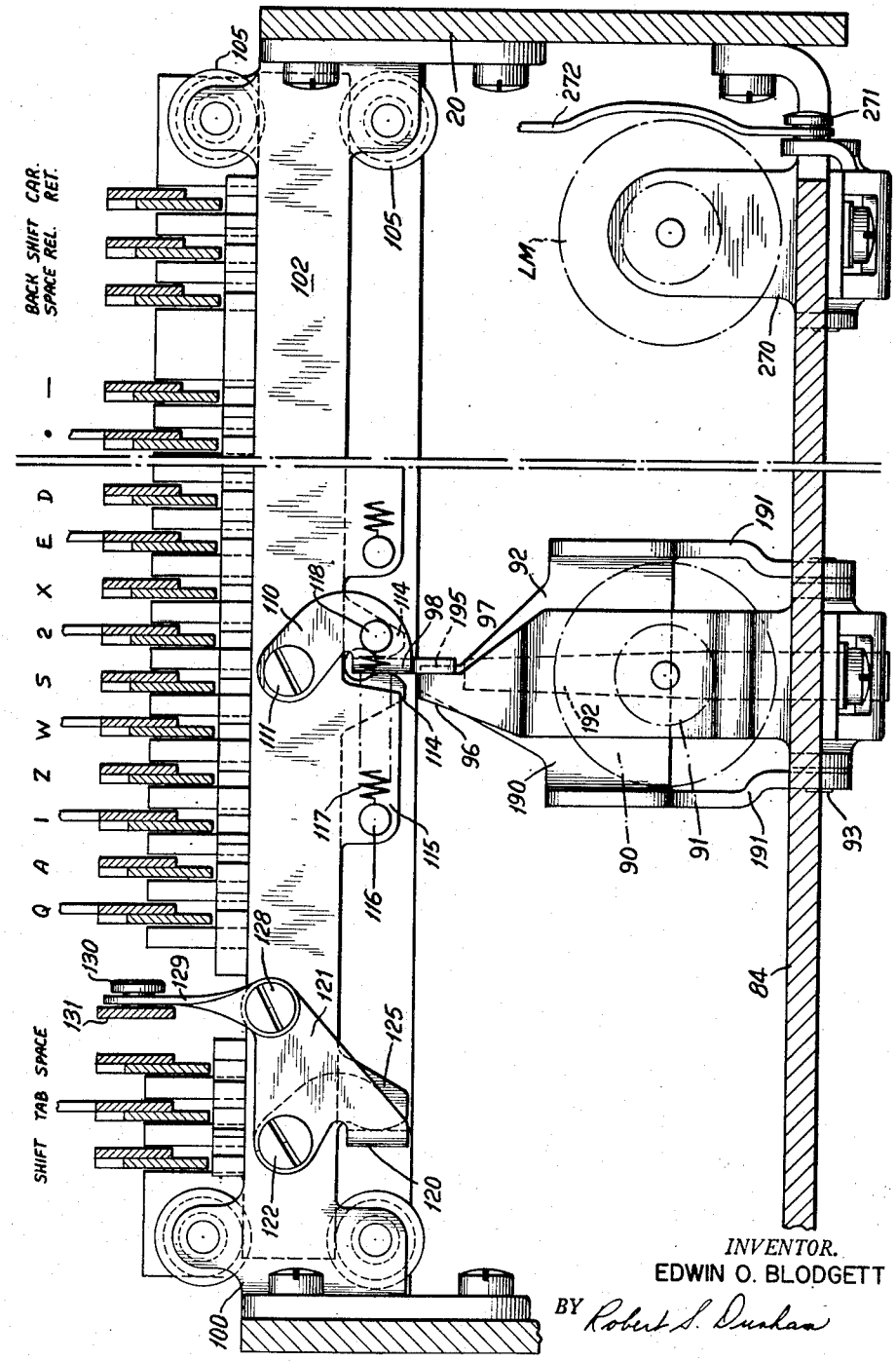
INVENTOR.
EDWIN O. BLODGETT
BY Robert S. Dunham
ATTORNEY.

July 27, 1954  E. O. BLODGETT  2,684,745
TELETYPEWRITER
Filed Nov. 21, 1950  10 Sheets-Sheet 5
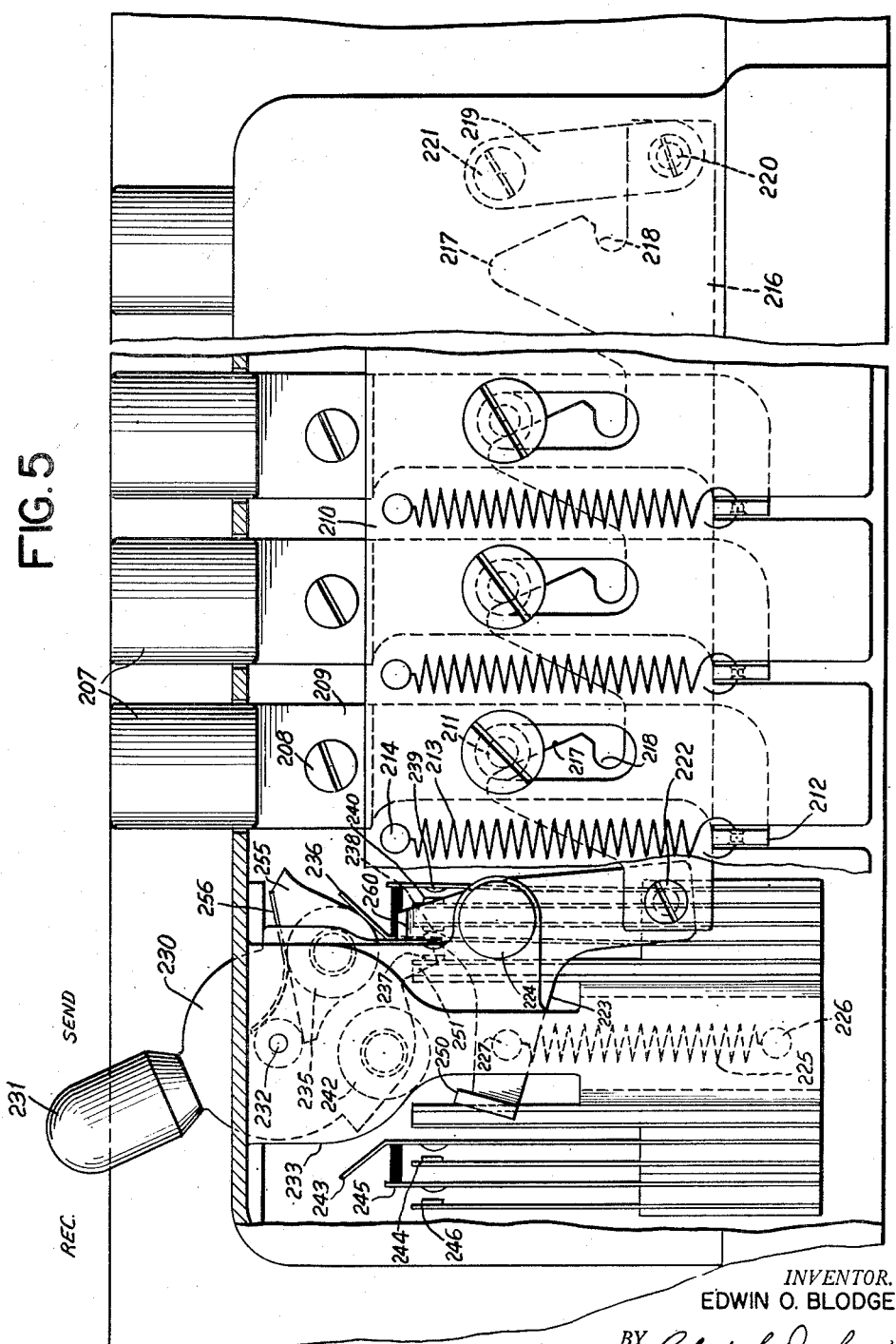
INVENTOR.
EDWIN O. BLODGETT
BY Robert S. Durham
ATTORNEY.

July 27, 1954     E. O. BLODGETT     2,684,745
TELETYPEWRITER
Filed Nov. 21, 1950     10 Sheets-Sheet 6
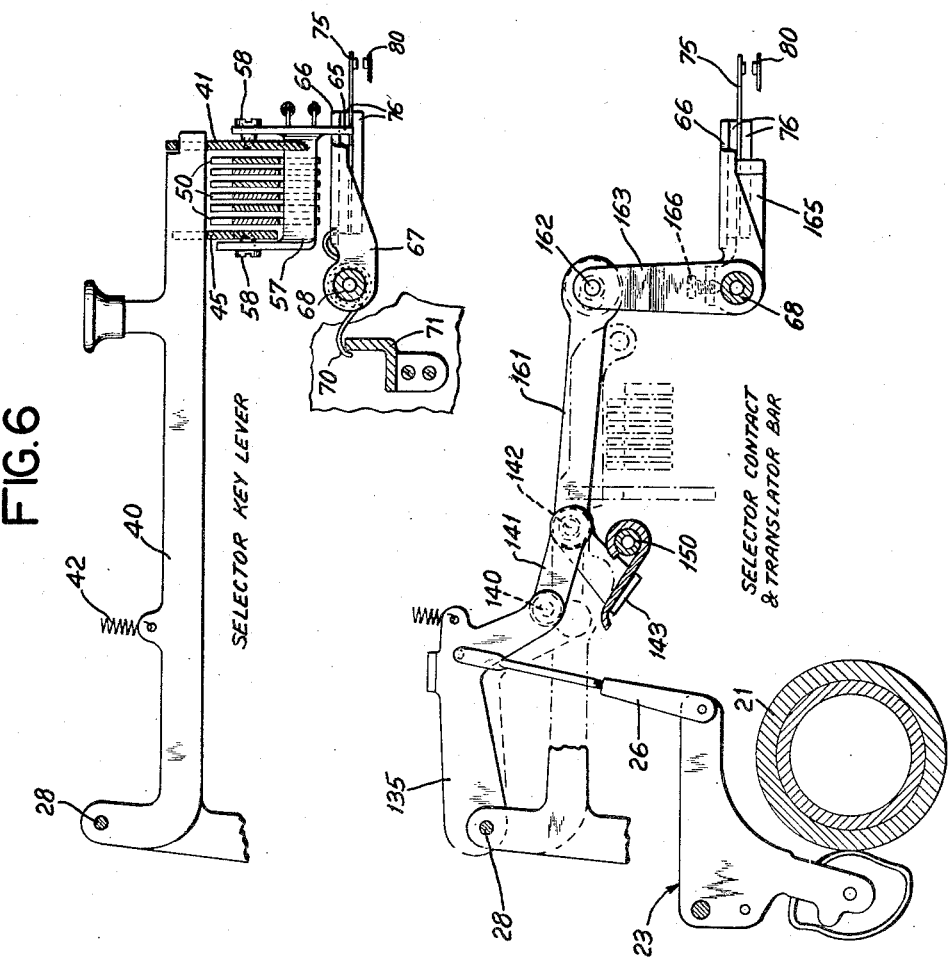
*INVENTOR.*
EDWIN O. BLODGETT
BY *Robert S. Dunlap*
ATTORNEY.

July 27, 1954 — E. O. BLODGETT — 2,684,745
TELETYPEWRITER
Filed Nov. 21, 1950 — 10 Sheets-Sheet 7

INVENTOR.
EDWIN O. BLODGETT
BY Robert S. Dunham
ATTORNEY

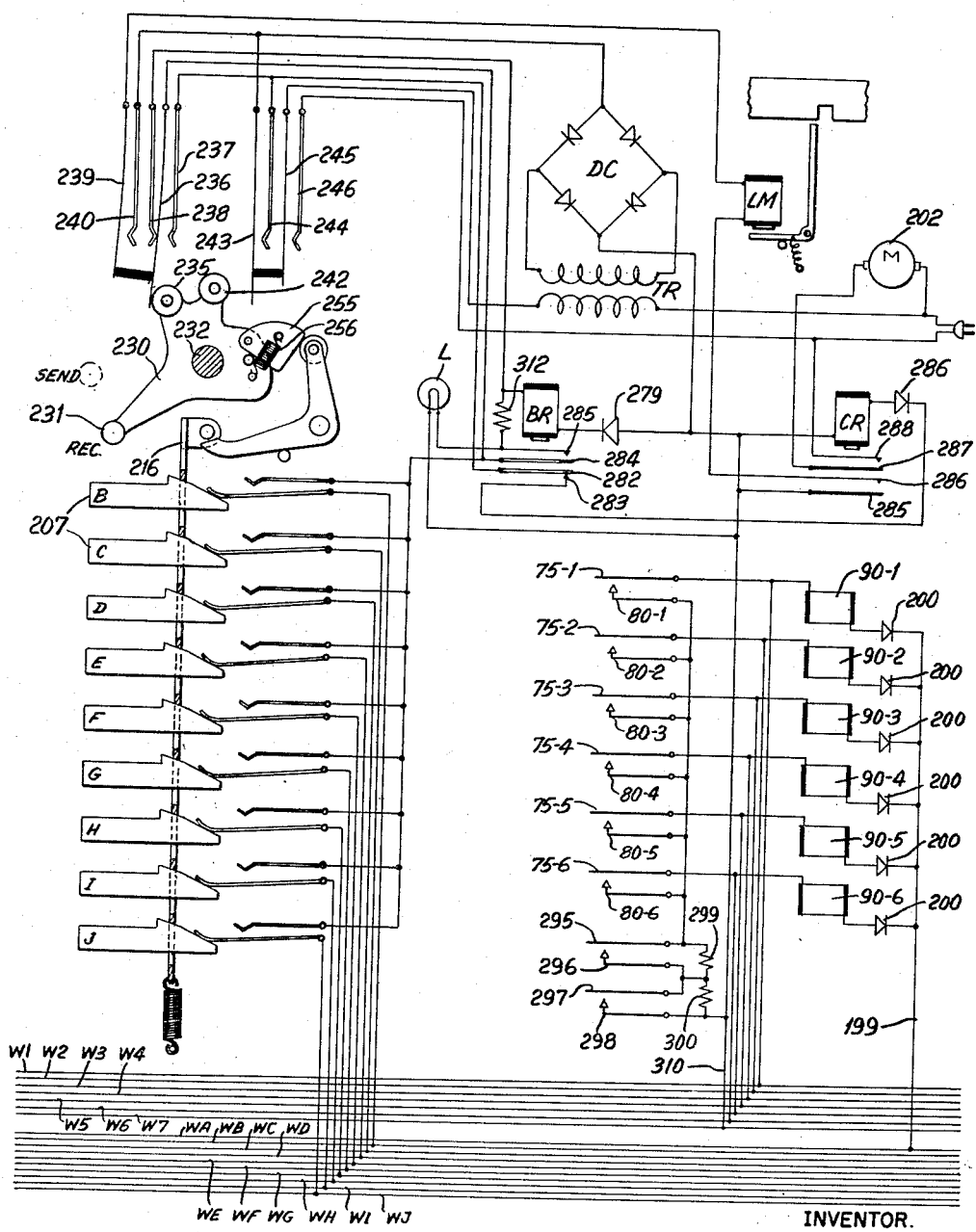

July 27, 1954  E. O. BLODGETT  2,684,745
TELETYPEWRITER

Filed Nov. 21, 1950  10 Sheets-Sheet 9

INVENTOR.
EDWIN O. BLODGETT
BY Robert S. Dunham

ATTORNEY.

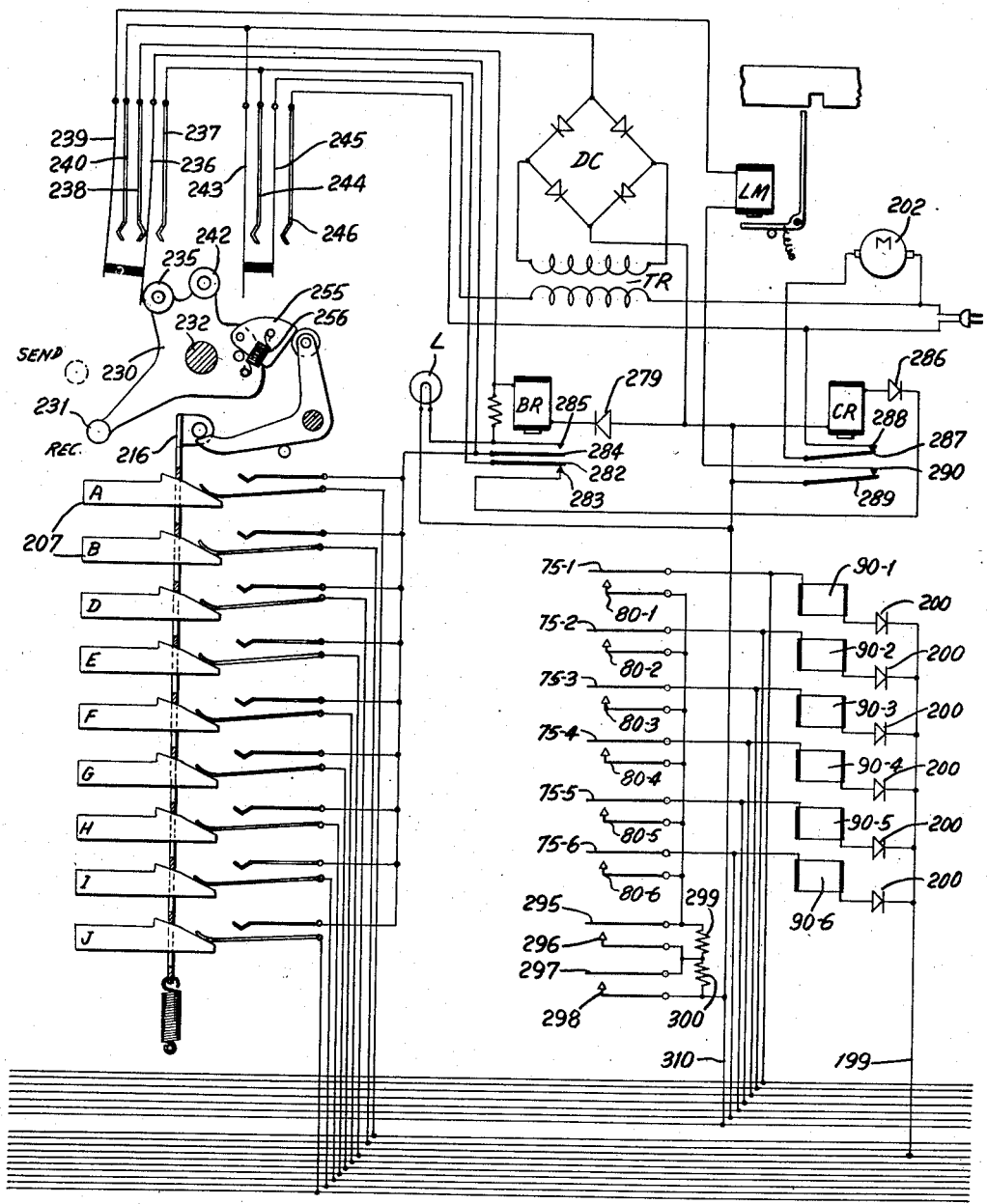

Patented July 27, 1954

2,684,745

UNITED STATES PATENT OFFICE 2,684,745

TELETYPEWRITER

Edwin O. Blodgett, Rochester, N. Y., assignor to International Business Machines Corporation, New York, N. Y., a corporation of New York Application November 21, 1950, Serial No. 196,807

7 Claims. (Cl. 197—19)

1

This invention relates to printing machines adapted to transmit and receive written messages between spaced locations.

The primary object of the present invention is to provide an improved keyboard operated printing machine adapted to transmit and receive messages with great accuracy and speed.

Another object of the invention is to provide a machine of the class described wherein the operator is given a visual indication that his manual manipulation of the keyboard has selected the correct code for transmission to another or other machines.

Other objects of the invention will be pointed out in the following description and claims and illustrated in the accompanying drawings, which disclose, by way of example, the principle of the invention and the best mode, which has been contemplated, of applying that principle. In the drawings:

Fig. 4 is a sectional view taken on line 4—4 of Fig. 1;

Fig. 5 is a front elevational view of the machine, with part of the casing broken away to show underlying structure;

Fig. 6 is a detail view of a selector key lever and associated mechanism;

Fig. 7 is a detail view of a selector contact in association with translator bars of the mechanism;

Figs. 10, 10A and 10B constitute a schematic diagram showing one method of interconnecting a plurality of the machines shown in the preceding drawings to form an intercommunicating printing system.

Figure 1:
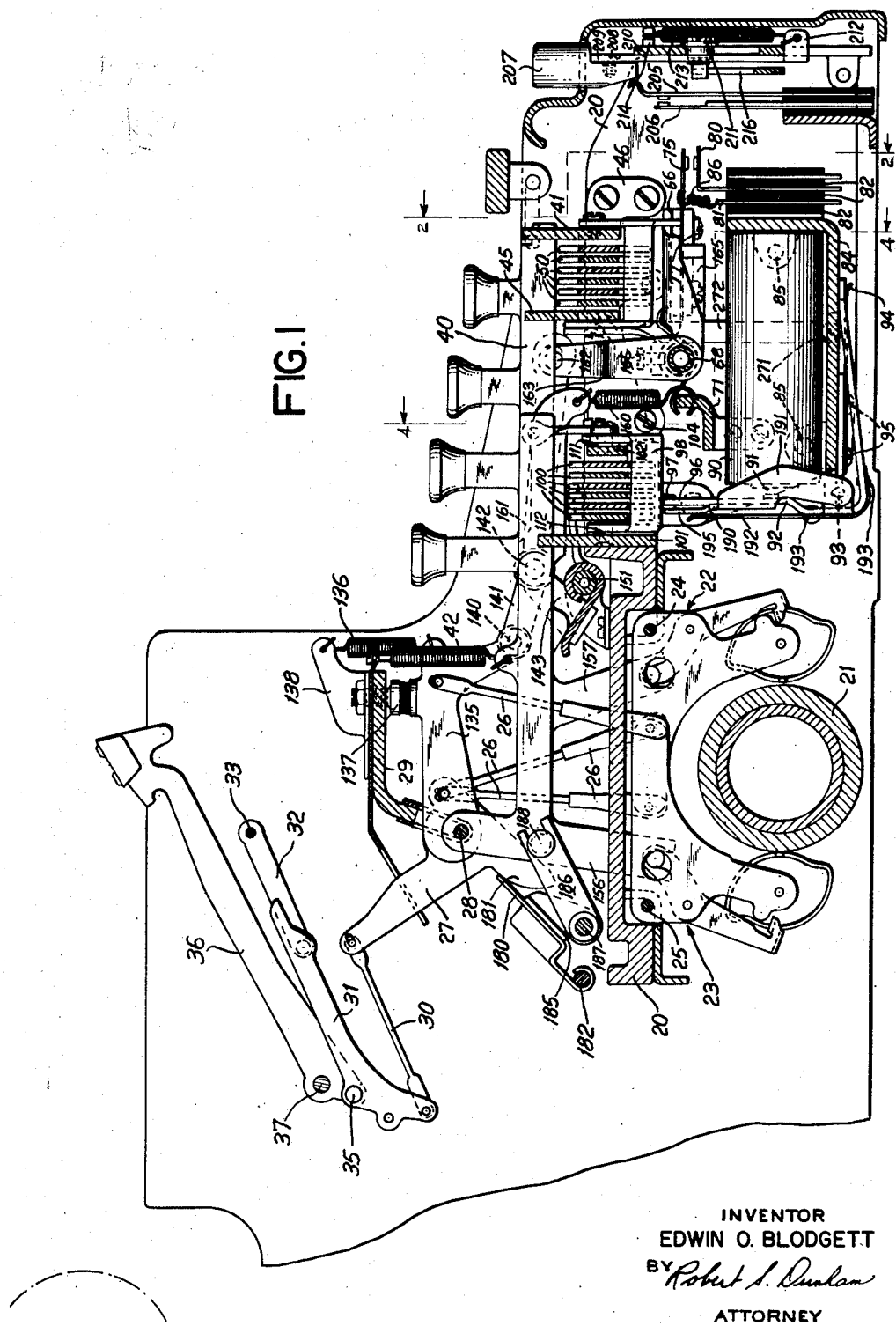
Fig. 1 is a vertical sectional view of a machine constructed in accordance with the present invention.

The present invention is disclosed in the drawings as applied to the well-known "Electromatic" typewriter, purely as a convenience in description. It will be understood that the invention may be applied to other power-operated typewriters without altering the principles or basic features of the invention. Since the "Electromatic" typewriter is now well-known, only a brief description will be given herein.

2

This machine is shown in Fig. 1 as including a frame 20 on which is mounted a continuously running rubber-covered power roll 21 driven by an electric motor (shown only in the control circuits). A row of front cam units 22 and a row of alternately spaced rear cam units 23 are arranged on opposite sides of the power roll 21 to operate about their respective fixed parallel fulcrum rods 24 and 25, respectively.

The cams 22 and 23 are each connected by a vertical adjustable link 26 to an associated bell crank 27 mounted to turn about a fulcrum wire 28 carried by a fixed cross member 29 of the machine frame. The upper end of each bell crank 27 is connected by a link to a toggle lever 31 which is pivotally connected at its front end to a toggle link 32 mounted to turn around a fixed fulcrum rod 33. The toggle lever 31 is also pivotally connected at 35 to a type bar 36 which is mounted in the usual manner to turn about a curved fulcrum wire 37. Thus, it will be seen that operation of one of the cam units by the power roll 21 will swing a type bar 36 into printing position against the paper carried by the usual platen.

In addition to the cam units which operate the various type bars of the machine, the "Electromatic" typewriter also includes several cam units for effecting other mechanical operations such as the carriage return mechanism, the case shift mechanism, the back space mechanism, the tabulating mechanism, and the carriage space mechanism. The machine illustrated in the present drawings is intended to have all these cams in their usual positions.

In the "Electromatic" machine, a manually operable key lever is connected mechanically to trip each of the cams into operative relation with the power roll 21, but in the machine shown in the accompanying drawings the key levers do not have a direct mechanical connection with their respective cam units. Referring to Figs. 1 and 6, the present machine includes a set of key levers 40 which may be generally the same as in the "Electromatic" except that the rear lower end portions in this case have no mechanical connection with their associated cam units. The various key levers 40 are all mounted in spaced parallel relation to pivot about the fulcrum rod 28 and are normally held upwardly against a stop bar 41 by associated springs 42. There is one of these key levers 40 for each of the characters printed by the machine and also a key lever for each of the functions of the machine such as case shift, tabulation, word spacing, back spacing and carriage return. The arrangement of the key levers is shown diagrammatically above Fig. 2.

Figure 3:
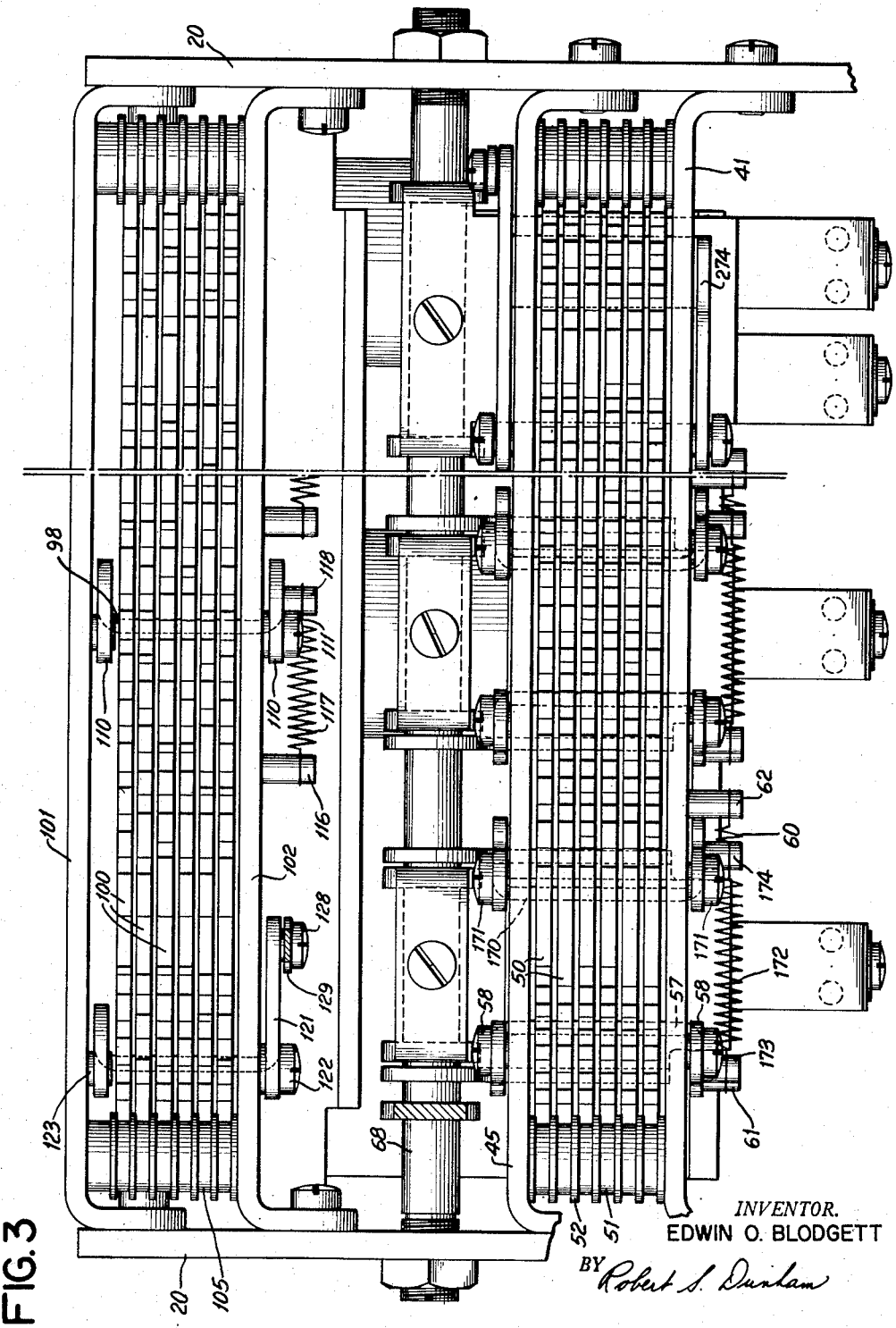
Fig. 3 is a plan view of the code selector and code translator mechanism.

In the present machine, the manual operation of each key lever selects a particular six-unit code assigned to the character associated with that key lever. The front ends of all the key levers 40 are guided for downward movement in vertical slots in the stop bar 41 and in similar slots in a spaced parallel bar 45. The bars 41 and 45 are rigidly mounted at each end by brackets 46 to the two side plates of the machine frame 20. Between the bars 41 and 45, there are six selector slides 50 mounted for individual longitudinal movement by upper and lower rollers 51 at each end as shown in Fig. 3. These rollers are separated by spacing washers 52 of a larger diameter which also serve to space the selector slides 50 for free movement transversely of the machine.

Figure 2:
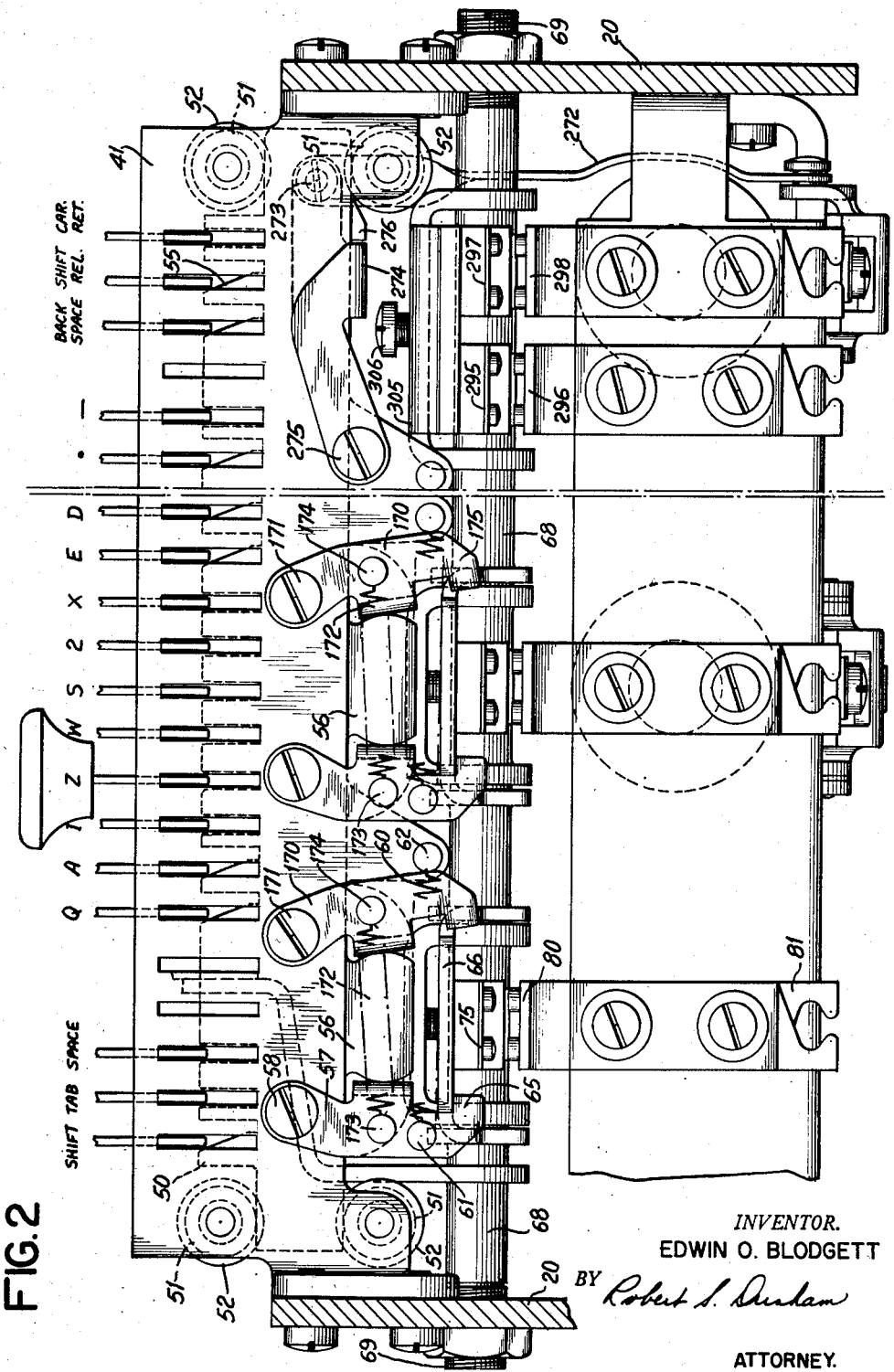
Fig. 2 is a sectional view of the machine taken on line 2—2 of Fig. 1.

The portion of each of the selector slides directly beneath each of the key levers is cut out in a particular manner to determine whether or not that slide is moved longitudinally by a depression of the key lever. When a selector slide is to be operated by a key lever, a notch is provided in the upper edge portion of the slide to form an inclined edge or cam 55 as shown in Fig. 2, so that a downward movement of the key lever will operate on this cam edge to move the selector slide to the left as viewed in Fig. 2. When a selector slide is not to be moved by a particular key lever, a notch is provided in the upper edge portion of the selector slide directly beneath the key lever which allows the key lever to be moved downwardly in the notch without causing a longitudinal movement of the slide. Thus, a cam surface or a clearance notch is provided in each of the selector slides directly beneath each of the key levers in a predetermined arrangement whereby the six selector slides may be moved in different combinations by operation of the different key levers.

Each of the selector slides has an extension 56 projecting downwardly from the lower edge, and this projection is in a relatively different longitudinal position on each of the six slides. For example, the front slide may have its projection 56 at the extreme left as viewed in Fig. 2, the next slide toward the rear of the machine may have its projection 56 spaced a particular distance to the right as viewed in Fig. 2, and so on, in order that all the slides have their projections 56 evenly spaced from left to right transversely of the machine as viewed in Fig. 2.

A U-shaped bail 57 is pivotally mounted by screws 58 adjacent each of the projections 56 so that a horizontal cross portion of each bail will normally rest against the left hand edge portion of its associated projection 56. The bails 57 extend beneath all six of the selector slides 50 and the two pivot screws 58 for each bail pass through clearance holes in the upper end of the bails, the front pivot screws 58 being threaded into the cross bar 41 while the rear pivot screw is threaded into the cross bar 45. A spring 60 extends between a pin 61 in the lower front portion of each of the bails 57 and a pin 62 secured to respective downward extensions on the cross bar 41.

The lower end of the front arm of each bail 57 is provided with a hooked portion or latch 65, and the upper edge of this latch 65 normally engages the lower surface of a contact operating arm 66. The arm 66 is provided with spaced ear portions 67 by which the arms are all mounted to turn freely on a transverse shaft 68. The shaft 68 is also mounted to turn freely upon pivots at each end, these pivots being in the form of adjustable shouldered screws 69 carried by the two side plates 20 of the machine frame. Thus it will be seen that a longitudinal movement of any one of the selector slides 50 to the left from its normal position will swing its companion bail 57 about its pivot 58 to move the latch portion 65 out of the path of movement of the contact operating arm 66 allowing it to move downwardly about the shaft 68 as shown in Fig. 6. A spring 70 causes downward movement of each of the arms 66 when released in this manner, this spring being positioned around the shaft 68 between the ears 67 of each of the contact arms with one end engaging the arm and the other end engaging a cross bar 71 carried by the machine frame.

Each arm 66 carries an electrical contact 75 mounted thereon by insulating spacers 76 and screws 77. When the arm 66 moves downwardly from its normal latched position, the electrical contact 75 engages a stationary electrical contact 80 which is mounted along with a terminal strip 81 by insulating spacers 82 on an L-shaped cross member 84 extending between the side plate 20 of the machine frame. The cross member 84 is mounted by screws 85 to each of the side plates 20, and the terminal strip 81 is connected by a flexible lead 86 to the movable electrical contact 75. It will be understood that there are six such contact assemblies spaced transversely of the machine, and each contact assembly is controlled by a particular one only of the selector slides 50. Thus, when any one of the key levers 40 is operated manually, a certain distinctive combination of selector slides is moved longitudinally to trip the associated ones of the contact operating levers 66 and thereby close a certain combination of the electrical contacts 75-80. It will also be noted that the upper portions of the selector slides 50 being arranged with either a cam portion or a clearance notch beneath each key lever prevent the depression of more than one key lever at one time. The operation of the six code contacts 75-80 causes an automatic printing operation in the same machine as well as any other similar machine to which these contacts are connected.

Before describing in detail the remaining portions of the selector mechanism, the operation of the translator mechanism to cause this automatic printing operation will be described. As will be described later in connection with the circuit diagram, each of the six sets of contacts 75-80 is electrically connected to cause energization of a companion one of six electro-magnets comprising coils 90 on magnetic cores 91 mounted in horizontally spaced relation on the L-shaped cross member 84 of the machine frame. Energization of each coil 90 attracts an armature 92 mounted to turn about a stationary pivot 93. The attraction of armature 92 is against the force of a leaf spring 94 attached at 95 to the cross member 84 so that the free end of spring 94 bears against the lower side of a forward extension of the armature 92 (see Fig. 1).

Referring to Fig. 1 and Fig. 4, it may be seen that the upper end portion 96 of each of the six armatures 92 is normally disposed opposite a downward projection 97 of a bail 98. The translator mechanism is generally similar in mechanical construction to the selector mechanism, in that there are six slides 100 mounted for free longitudinal movement between spaced transverse bars 101 and 102. The rear bar 101 is attached to the machine frame 20, and the end portions of the bar 102 are mounted by screws 104 to opposite side plates 20 of the machine frame. The six slides 100 are mounted in spaced, parallel relation for free longitudinal movement by rollers 105 arranged above and below the opposite end portions of the slides the same as in the case of the selector slides 50. The translator bails 98 are generally similar to the selector bails 61 and are disposed beneath all six of the translator slides 100 with upwardly extending ear portions 110 arranged to turn about fixed pivots 111 and 112 carried by the front and rear cross members 102 and 101, respectively.

Each of the six translator slides 100 is provided with a bifurcated downwardly extending portion 114 which receives the horizontal portion of the companion bail 98. The bifurcated portion 114 is in a different longitudinal position on each of the six slides so that a slide is connected to only one of the six bails 98. In other words, the front translator slide 100 may have its downward projection 114 at the extreme left to connect to the left hand bail 98 as viewed in Fig. 4, the next rearward slide 100 may have its downward projection spaced slightly to the right to be connected to the second bail 98 from the left, etc. The front cross bar 102 is provided with six spaced, downwardly extending portions 115, each of which carries a spring pin 116 for anchoring one end of an extension spring 117, connected at its other end to a pin 118, carried by its companion bail 98. Thus, energization of one of the electromagnet coils 90 will attract its armature 92 moving the upper end 96 out of the path of movement of the bail extension 97 to allow the spring 117 to pull the bail and its companion translator slide 100 to the left, as viewed in Fig. 4, until the bail engages the right hand surface of the downward extension 115 of bar 102.

It will now be seen that a manual depression of any one of the key levers 40 will cause endwise movement of certain of the selector slides 50 to release the associated ones of the contact operating arms 66 and close certain ones of the contacts 75–80. These closed contacts will in turn cause energization of the associated ones of the electromagnet coils 90 to attract their armatures 92 and release the associated ones of the six translator slides 100. The selector slides and the translator slides may be arranged, respectively, in the same order, if desired, so that if, for example, the front and rear ones of the selector slides are moved longitudinally by an operation of a certain key lever, the corresponding front and rear translator slides 100 will also be released through energization of the associated electromagnet coils 90.

At the extreme left hand portion of the machine, another bail 120 extends across beneath all six of the translator slides 100, and is likewise provided with ear portions 121 by which it is pivotally mounted on a pivot screw 122 carried by the front transverse bar 102 and a pivot pin 123 carried by the rear transverse bar 101. Each of the six translator slides 100 is provided with a downward extension 125 at its left hand end portion, and all of these extensions 125 normally engage the cross portion of the bail 120. Referring to Fig. 4, it may be seen that the front ear 121 of the bail 120 is pivotally connected at 128 to a vertical link 129 which is, in turn, pivotally connected at 130 to a lever 131.

Figure 8:
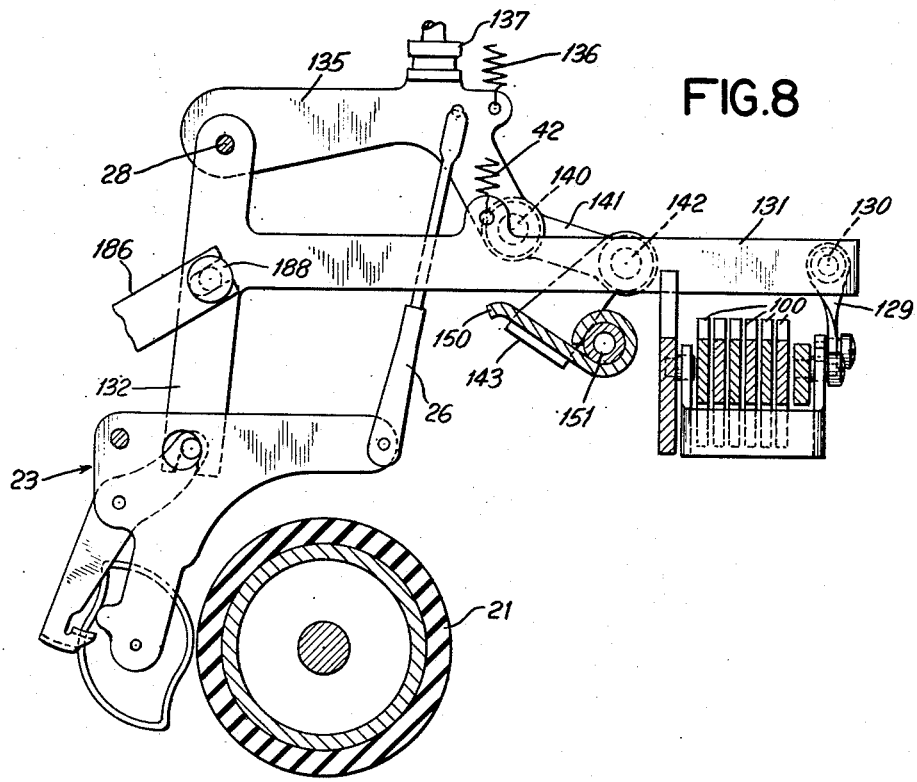
Fig. 8 is a detail view of an auxiliary cam control lever in association with translator bars.

The lever 131 is arranged to function generally in the same manner as one of the key levers, in that it is normally held in its upward position by one of the usual springs 42 and is mounted to turn about the usual fixed pivot rod 28 with a downward extending portion 132 connected to trip one of the regular rear cam units 23 (see Fig. 8). Thus it will be seen that whenever one or more of the translator slides 100 move endwise to the left, as viewed in Fig. 4, the bail 120 will be rocked about its pivots 122 and 123 to pull the lever 131 downwardly and trip the associated cam unit 23.

The cam unit 23, controlled by lever 131, is in this case connected by the regular adjustable link 26 to operate a toggle lever 135. The lever 135 is mounted to turn around the regular fulcrum rod 28 and is normally held upwardly by a spring 136 against an adjustable stop 137 carried by the cross member 29 of the machine frame. The upper end of the spring 136 is connected to a bracket 138, also attached to the cross member 29. The front end of the toggle lever 135 is connected by a pivot pin 140 to a toggle link 141 which is, in turn, pivotally connected at 142 to an arm 143 attached to a universal bar 150 extending transversely of the machine and mounted at each end to turn about pivot pins 151 carried by companion brackets 152 secured at 153 to the machine frame 20.

Figure 9:
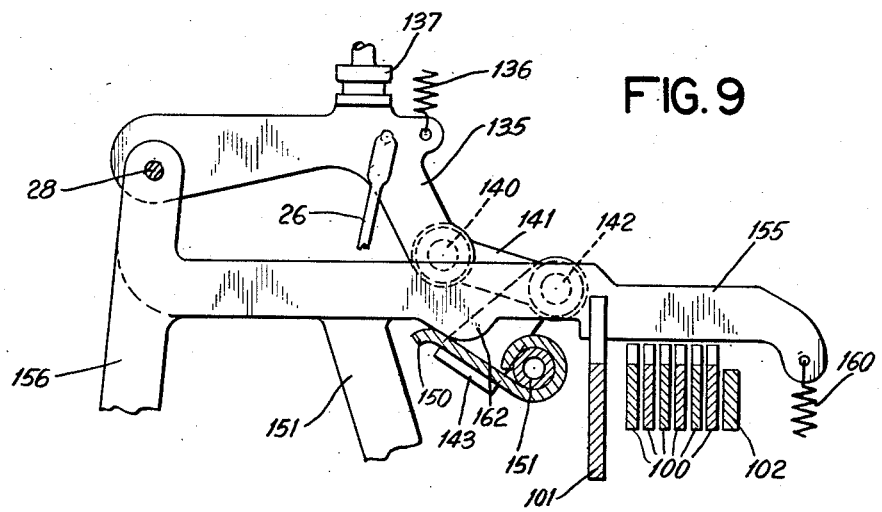
Fig. 9 is a detail view through a cam trip lever system in relation to translator bars.

As previously described, there is a full complement of the front and rear cam units 22 and 23 provided for operating all of the type bars 36, and in this instance each of these cam units is controlled by one of a complement of levers 155 which are shown particularly in Fig. 9. The rear end portions of these levers 155 are shaped so that alternate ones of the levers 155 have downward extensions 156 adapted to trip the rear cam units 23 while the other levers 155 have downward extensions 157 adapted to trip the front cam units 22. These levers 155 are all mounted to turn about the fulcrum rod 28 and are disposed in spaced parallel relation across the machine, each of the levers 155 being positioned adjacent one of the key levers 40.

The levers 155 which trip the cam units in the present machine are biased downwardly at their front ends by springs 160, each spring being connected at its upper end to the front end portion of the associated one of the levers 155 and the lower end being anchored to the cross member 71 of the machine frame (see Fig. 1.) The central portion of each of the levers 155 is provided with a downward extension 162 which rests against the universal bar 150, and normally the universal bar is prevented from turning by the arm 143 acting against the straightened toggle formed by link 141 and arm 135. In Fig. 9, it will be seen that the pivotal connection 140 between the link 141 and arm 135 is disposed in a straight line between the pivot 142 and the fulcrum rod 28 so that any turning effort on the universal bar 150 in a counterclockwise direction is transmitted to the fulcrum rod 28 in a manner which does not tend to rotate the toggle arm 135. In this manner the combined forces of all of the springs 160 are directed against the pivot rod 28 without tending to rotate the toggle arm 135. In this position of the arm 135, all of the levers 155 are held upwardly in a position where the lower front edge of each of the levers is clear of the upper edge portion of all of the six translator slides 100.

When the previously mentioned downward movement of lever 131 trips its cam unit 23 into cooperative relation with the power roll 21, it will be clear that the cam unit will cause a downward movement of the front end of toggle lever 135 to, in turn, rotate the universal bar 150 in a counterclockwise direction as viewed in Fig. 9 to its position shown in Fig. 7. This allows all of the levers 155 to move downwardly into cooperative relation with the six translator slides 100 under the force of springs 160. The upper edge portion of each of the translator slides 100 is provided with notches arranged in a particular manner to form projections, either disposed beneath the levers 155, or to the right of these levers to form a code translating arrangement, whereby a notch on all six slides will be positioned beneath any one of the levers 155 only by a particular combination of movements of the slides. In other words, when any combination of the translator slides 100 is moved endwise with the other slides stationary, a notch on each of the slides will be positioned beneath only one of the levers 155 and a projection on at least one of the six slides will be positioned beneath each of the other levers. Thus, when the universal bar 150 is operated as previously described, only one of the levers 155 will be moved downwardly by its spring 160 far enough to trip its associated cam unit and all the rest of the levers 155 will engage and will be stopped by one or more of the translator slides 100. This effective movement of the selected one of the levers 155 will cause a printing operation of one of the type bars 36 in the usual manner.

The above printing operation ordinarily occurs very rapidly after the manual depression of one of the key levers 40 to trip one or more of the contact operating levers 66 to close the contacts 75-80. When the operated key lever 40 is released its spring 42 will return it to its upper normal position, allowing all the operated selector slides 50 to be returned to their normal position by their springs 60. However, the contact operating arms 66 which have been released ordinarily remain in their tripped position to hold contacts 75-80 closed after the key lever has returned to normal position, and means are provided in accordance with the present invention for restoring these contact operating levers 66 to their normal latched position only after the translator mechanism has been effective to cause a printing operation. This means is shown in Figs. 1 and 7 as comprising a link 161 having its rearward end pivotally connected at pin 142 to arm 143 of the universal bar 150, the forward end of the link 161 being provided with a slot receiving a pin 162, the pin 162 being carried at the upper end of an arm 163 which is rigidly connected to the transverse shaft 68. Each of the contact operating arms 66 is mounted by spaced downwardly turned ear portions to turn relative to the shaft 68, and between these ear portions is an arm 165 which is fixed against turning movement relative to the shaft 68 by a screw 166. Thus when the shaft 68 is turned in a counterclockwise direction, each of the arms 165 will lift upwardly on the associated contact lever 66 to move it upwardly slightly beyond its normally latched position. This counterclockwise rotation of shaft 68 is caused by the downward movement of the toggle arm 135 to cause a printing operation as previously described.

When the selector slides have returned to their normal right hand position upon the return of the key lever to normal position, the latch portion 65 of each of the bails will rest beneath the lower edge of the contact arms 66, thereby holding all the arms and the contacts 75-80 in their normal position as shown in Fig. 1. The slot in the end of link 161 allows the shaft 68 to turn when one or more of the contact arms 66 is released inasmuch as the pin 162 has clearance permitting it to move forward relative to the link 161.

A means is provided in accordance with the present invention for preventing a repeat operation of the foregoing mechanism in the event the operator holds down a key lever 40 for an extended period of time so that the key lever is in its depressed position at the time the contact levers 66 are being restored. Referring to Fig. 2, it may be seen that this anti-repeat mechanism comprises a second set of bails 170 similar to the bails 57, but oppositely disposed to bear on the right hand side of the selector slide extensions 56. The bails 170 are pivoted at 171 on the cross bars 41 and 45 and a spring 172 extends between a pin 173 on the bail 57 and a pin 174 on the bail 171. A hook or catch portion 175 is provided on each of the bails 170. The hook portion 175 is shaped similar to the hook portion 65 on bail 57, but is slightly shorter than the hook portion 65. When the contact arm 66 is being held by the hook portion 65 with the associated selector slide in its normal right hand position, the bail 170 is swung to the right so that the hook portion 175 is out of the path of movement of the contact arm 66 and the upper edge portion is slightly above the lower edge of this contact arm. In the event a key lever is held down at the time the contact lever 66 is being restored, the bail 170 will be swung to the left from its illustrated position by the spring 172 so that when the arm 66 is in its uppermost position the latch 175 will snap beneath its lower edge. The arm 66 is thus held slightly above its normal position but when the key lever is released and the selector slide returns to its normal position, the bail 170 is moved to the right to its illustrated position, releasing arm 66 from the hook portion 175 and allowing it to move downwardly a slight distance to engage the hook portion 65 of the bail 57. In this manner it will be seen that each operation of the machine involves a downward and an upward motion of a key lever and a second operation cannot be caused by holding the key lever in its downward position for any extended period of time.

After the selected one of the translator levers 155 has been operated downwardly and restored by the universal bar 150 to cause a printing operation as previously described, the translator slides 100 which were tripped by the selection must be restored to their normally latched position. In the present arrangement, the translator slides 100 are all restored by an upward movement of the lever 131, and this upward movement of the lever is caused by operation of the usual ribbon universal bar 180. The ribbon universal bar 180 extends transversely of the machine and is operated by a depending portion 181 of each of the bell cranks 27. The bar 180 is rocked about the pivot shaft 182 by the printing operation of any one of the type actions.

The universal bar 180 is also operated by each of the other cam-operated mechanisms of the machine such as the carriage return, case shift, space, back space and tabulating mechanisms.

In the arrangement shown in Fig. 1, a bracket 185 is suitably attached to the universal bar 180, and a link 186 is pivotally connected to the bracket 185 at 187. A slot is formed in the front end of link 186 as shown in Fig. 1, and this slot receives the body portion of a pin 188 attached to lever 131.

It will now be clear that when the universal bar 150 is operated to cause a printing operation selected by the particular position of the translator slides 100, this printing operation will operate the ribbon universal bar 180, which will turn lever 131 in a counterclockwise direction about its pivot rod 28. The upward motion of the front end of lever 131 will operate through the connecting link 129 to turn arm 121 about its pivot 122, which will act through the transverse bail 120 on all of the projections 125 of the translator slides 100 and thereby restore all of the slides to the right, slightly beyond their normal latched position.

In the event the electromagnets associated with the translator slides 100 are all deenergized at the time these slides are returned beyond their normal position, it will be clear that their springs 94 will cause the upper end portions 96 of each of the armatures 92 to move into normal position in the path of the bail extension 97, thereby retaining the translator slides in their normal position when the lever 131 again moves to its normal upper position. However, if the electromagnets 90 are still energized at the time the translator slides 100 are returned as previously described, means are provided in accordance with the present invention for preventing the translator slides from again moving to the left and causing a repeat operation of the printing mechanism.

This arrangement is shown particularly in Fig. 1 and Fig. 4, wherein it may be seen that a second latch member 190 is provided for each of the armatures 92, and this latch member is mounted for pivotal movement around the same pivot rod 93 by spaced parallel ear portions 191. A leaf spring 192 is secured at 193 to the armature 92 and the upper end of this spring bears against the rear surface of the latch member 190 to hold it in engagement with the armature 92 so that normally the armature and the latch member 190 move as a unit about the pivot 93. The upper end portion 195 of the bail 190 is shaped similar to the upper portion 96 of the armature 92 in order to coact with the downward projection 97 of the associated bail 98. The vertical edge of the upper end portion 195 which coacts with the projection 97 is spaced a slight distance to the right of the similar edge of the portion 96 of armature 92 so that when armature 92 is attracted, the front surface of the portion 195 will engage the edge of the projection 97 and the armature 92 will separate from the bail 190 against the force of the spring 192. If the electromagnet 90 is still energized when the translator slides 100 are restored, this restoring movement moves the bail projection 195 far enough to the right as viewed in Fig. 4, so that the upper end of bail 190 is snapped behind the projection 195 under the force of the spring 192, thereby holding the translator slides slightly to the right of their normal position as long as the magnet is energized. When the magnet 90 is deenergized under this condition, the armature spring 94 will move the armature 92 back to its normal position illustrated in Fig. 1, thereby moving the bail 190 rearwardly to disengage the upper extension 195 from the extension 97, allowing a slight movement of the translator slides 100 to their normal position wherein the portion 195 engages the upper end 96 of the armature 92.

It will be clear that this arrangement effectively prevents the translator slides from again moving to the left in the event the electromagnets are still energized after the translator slides have completed their return movement at the end of a printing operation. In other words, each printing operation must include a complete cycle of operation of the electromagnet 90 including its energization to attract its armature and the following deenergization to release its armature. Therefore, an energization of the electromagnet for an extended period of time cannot cause more than one operation of the printing mechanism.

The mechanical features of a single machine have now been described wherein a code is automatically selected by the manual operation of a standard typewriter keyboard and a translator mechanism in the same machine responds to the selected code to print a character corresponding to the key which was manually operated. An arrangement of this type gives the operator a visual indication that the correct code for controlling other similar machines has been selected by the manual operation of the key lever, inasmuch as this code acts on the translating mechanism of the machine being operated in the same manner as it does at any other similar machine to which the code contacts are connected. In other words, there is no mechanical connection between the key lever operated manually and the printing mechanism in the same machine, and accordingly, it may be presumed that the electrical circuits will operate a remote machine in exactly the same manner as they do the machine on which the keyboard is located.

It was previously pointed out that a plurality of machines of the kind herein described may be interconnected through electrical circuits to provide an intercommunicating printing system. A particular feature of the present invention is in the circuit arrangement whereby a number of these machines may be interconnected by a minimum number of wires extending between the machines. It may be generally stated that this is accomplished by the use of a common conductor or wire for each of the six electromagnets 90 of all machines and an individual wire for each machine which is connected to all the electromagnets at that machine only. In other words, there are six common code wires extending to all machines of the system rather than six individual code wires for each machine, thus making possible the use of only one wire for each machine in addition to the six common wires. The number of wires for the selection of characters in any system will then be six, plus the number of machines in the system, and all the machines may be individually selected for operation.

This system which will be described in detail is particularly adapted for interchanging messages between points within a comparatively small area, such as between offices in one or more buildings on the same premises, between locations aboard a ship or between large land or air craft. The system, furthermore, is in no way confined to the transmission and reception of one message at a time since the machines not involved in the handling of a given message may be used at the same time in any combination desired for the handling of other messages. In a ten-machine system, for example, five messages may be transmitted and received at the same time, or one machine may transmit a message to more than one or to all the other machines simultaneously.

Figure 10A:
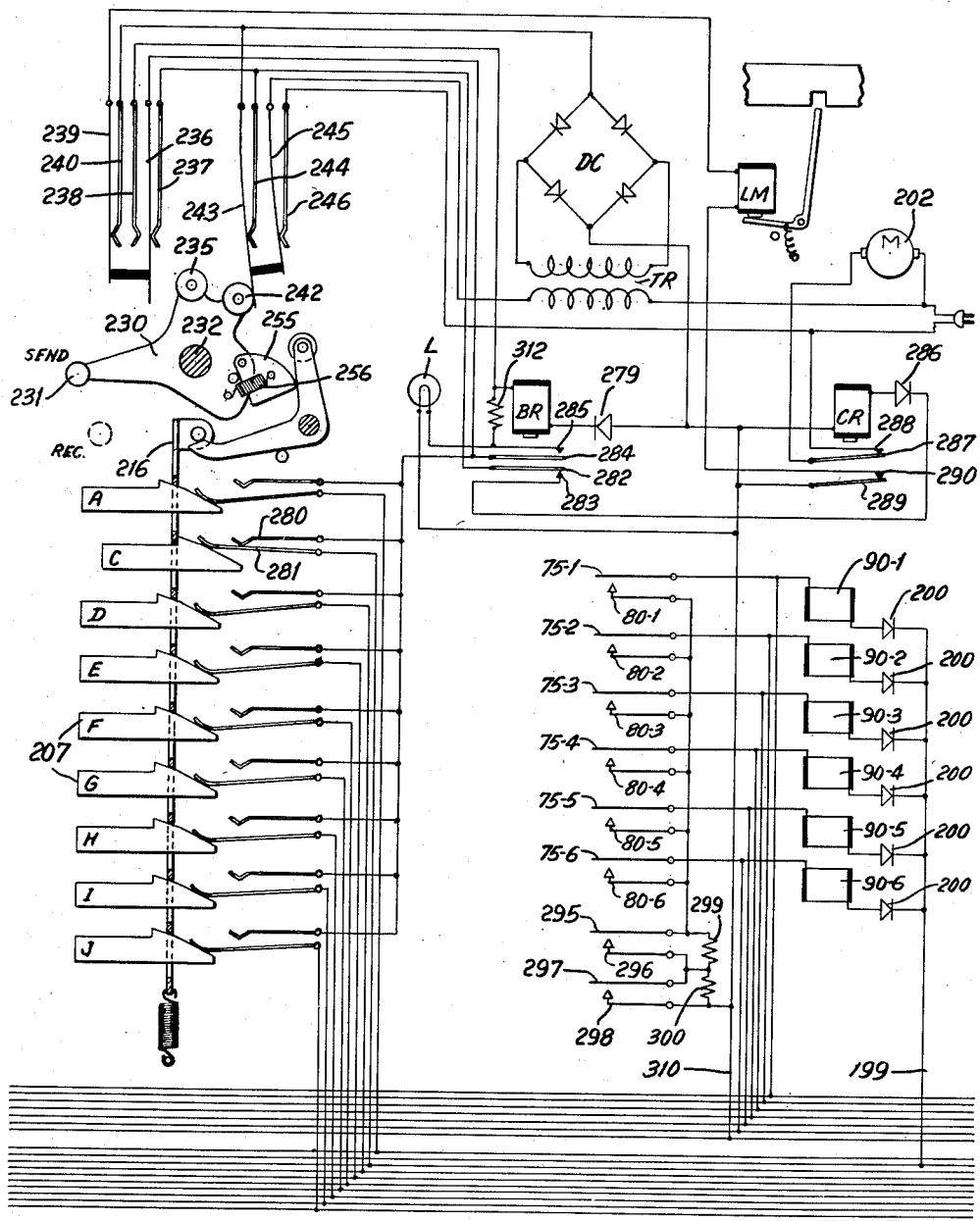

Figs. 10, 10A and 10B show in detail the schematic wiring diagram of three machines of a ten-machine intercommunicating system. In order to provide selective communication between each machine and any one or more of the other machines, a switching arrangement, shown in this instance as interlocking push buttons A to J, is provided, there being one push button for each of the machines of the system.

It will be noted that there are six-interconnecting wires W1 to W6 inclusive, extending between all of the machines, and these wires are connected at each machine in the same manner to the six magnets 90 previously described in each machine. The six magnets 90 are individually designated in the wiring diagram as 90—1 to 90—6 inclusive, and it will be noted that one side of the winding of the magnet coil 90—1 is connected to wire W1 at each machine, the similar side of the winding of magnet coil 90—2 is connected to wire W2 at each machine and so on, so that all of the six electromagnets 90 at all of the machines are connected in multiple through the wires W1 to W6. An arrangement which will later be described in detail is provided including an additional common wire W7 for controlling operation of the machines and for insuring privacy and preventing interruption of an existing transmission of a message by a machine which is not involved.

The other side of the windings of all six of the windings of the electromagnets 90 at each machine are connected to a common wire 199 through individual rectifier units 200, and this wire 199 is connected to an individual wire for each machine. Thus, the wire 199 for machine A is connected to WA, the wire 199 for machine B is connected to wire WB, and so on.

A local source of power is required at each machine and such source is indicated as the conventional alternating current and may be of any suitable voltage available. A motor 202 which operates the power roll 21 of each machine is connected to this power source, as will be later described, and a transformer TR is shown with its primary winding connected to this power source and its secondary winding connected to a full-wave rectifier unit DC for supplying a local source of direct current energy at each machine.

The interlocking push keys A through J may be of any well known construction; the details of one particular form which they may assume is shown, particularly in Figs. 1 and 5. In this construction, the manually operable keys 207 are arranged across the front of the machine in front of the keyboard and each is operable downwardly to move an electrical contact 205 into engagement with a companion contact 206 (Fig. 1). The lower front surface of each key 207 is cut away and attached at 208 to a vertical guide plate 209. The plates 209 are all carried by a stationary cross member 210 which has spaced, vertical slots receiving the shouldered portion of a screw 211 threaded into each of the plates 209. A lug 212 is formed at right angles to each of the plates 209 to extend forwardly through a lower vertically disposed slot in the cross member 210, and a spring 213 is connected to the forward end of this lug 212 with its upper end connected to a pin 214 secured to the cross member 210. The rear surface of the push button 207 is provided with a sloping cam portion cooperating with the upper end of contact 205 so that when the push button is moved downwardly contact 205 is moved into engagement with contact 206.

An interlocking bar 216 extends horizontally across the machine in the rear of all of the vertical slides 209. The bar 216 is provided with a series of upwardly extending projections opposite each of the push switches, and each of these projections is provided with a cam surface 217 and a latch surface 218 coacting with the rearwardly extending end of screw 211 (Fig. 5). Thus, when any one of the keys 207 is pushed downwardly, the end of screw 211 cams the bar 216 to the left, as viewed in Fig. 5, and when the key reaches its extreme downward position, the bar 216 will move back slightly to the right so that latch 218 will hold the key in its downward position. When another key 207 is subsequently pushed down, the bar 216 will likewise be moved to the left in the same manner, which will release the previously operated key from the latch portion 218, allowing it to be restored to its upper normal position, and the secondly operated key will be latched down by its latch portion 218.

The right hand end of the interlocking bar 216 is mounted for horizontal movement by a link 219 connected at its lower end at 220 to the bar 216, and the upper end of link 217 is pivotally mounted at 221 to the cross member 210. The left hand end of bar 216 is pivotally connected at 222 to the lower end of the vertical arm of a bell crank 223, which is also pivotally mounted at 224 to the cross member 210. A spring 225 extends between a pin 226 and a pin 227 in the horizontal arm of bell crank 223 and thus acts to normally bias the bar 216 to the right for holding down any one of the key buttons 207.

In addition to the interlocking push switches, the present machine is equipped with a manually operated "send-receive" switch. The mechanical details of one form of this switch are shown in Fig. 5, where it may be seen that a switch lever 230 having a manually operable knob 231 is pivotally mounted at 232 to a bracket 233 secured to the front casting of the machine frame. The lower end of the contact lever 230 carries an insulated contact operating roller 235 arranged when the lever is in its "receive" position to operate a contact 236 into engagement with a contact 238, and when the lever 230 is moved to the "send" position, the roller 235 allows contact 236 to engage a contact 237 and also allows a contact 239 to engage a contact 240. A second insulated roller 242 similar to roller 235 is mounted on the lower end of lever 230 and adapted when the lever is moved to the "send" position to operate a contact 243 into engagement with a contact 244 and also operate a contact 245 into engagement with a contact 246. Both of these pairs of contacts are normally open when the lever is in its "receive" position as shown in Fig. 5. The lever 230 is resiliently retained in either extreme operated position by the action of the angular end portions of contact springs 236 and 243 on rollers 235 and 242, respectively.

In accordance with the present invention, there is a mechanical interlocking arrangement provided between the keys 207 and the key switch 230. This interlock is so arranged that effective operation of the keys is prevented except when the switch is in its "receive" position. The interlock is provided by the bell crank 223 which has a bent-over portion 250 coacting with a downwardly extending projection 251 at the lower end of the switch lever 230. The projection 251 is moved into the path of the bell crank portion 250 when the switch is in its "send" position so that the interlocking bar 216 cannot move to the left from its illustrated position. When the interlocking bar 216 cannot move to the left, it will be clear that none of the keys 207 can move downwardly due to the engagement of the screw end 211 with the cam surface 217.

The present invention also provides another interlocking mechanical arrangement between the "send-receive" switch and the interlocking bar 216 so that the keys 207 will be released when the switch is moved from its "send" position to its "receive" position, and at the same time this arrangement is so constructed that the release movement of the interlocking bar 216 will not occur when the switch is moved in the opposite direction from its "receive" position to its "send" position. The details of the mechanism for accomplishing this purpose are shown particularly in Fig. 5 wherein a T-shaped member 255 is pivotally mounted on the end of lever 230 around the same pivot which mounts the roller 235. The T-shaped member 255 is biased by a leaf spring 256 in its illustrated position wherein its left-hand end engages the pivot hub 232 for the lever 230. It will be clear that when the lever 230 is moved from its illustrated position to its "send" position the right hand end of the member 255 will engage the upper end 260 of the bell crank 223 and will be turned relative to the lever 230 against the force of spring 256 and will not cause operation of bell crank 223. However, when the lever 230 is moved in the opposite direction from its "send" position to its "receive" position, the right hand end of the T-shaped member 255 will have a camming action on the left hand vertically curved edge of the upwardly extending end 260 of the bell crank 223, and as the member 255 cannot turn clockwise relative to the lever 230 due to the engagement of the left hand portion with the hub 232, the bell crank 223 will be turned in a clockwise direction as viewed in Fig. 5. This movement of the bell crank 223 will pull the interlocking bar 216 to the left, as viewed in Fig. 5, thereby releasing any of the keys which are held in their latched position.

A magnetic key lever lock is provided in the present machine for preventing effective manual operation of any of the key levers 40 when such operation would interrupt or mutilate any existing message transmission or when the machine is disconnected from its power source. Referring to Fig. 4, the magnetic means for controlling the locking and unlocking of the key levers is an electromagnet LM similar to the magnet 90 and mounted in the same manner on the cross member 84. This magnet operates an armature 270 similar to the armature 92, and the forward extension of this armature 270 is connected at 271 to a vertical link 272. Referring to Fig. 2, it may be seen that the upper end of the vertical link 272 is pivotally connected at 273 to the arm of a lock bail 274. The bail 274 is pivotally mounted at 275 on the cross members 41 and 45 as may be seen in Fig. 3, and the right hand edge of the horizontal cross portion of the bail 274 coacts with a downward projection 276 on each of the selector slides 50. Thus, when the bail 274 is in its upper position as shown in Fig. 2, none of the selector slides 50 can be operated to the left from their normal illustrated position, and accordingly none of the key levers 40 can be effectively depressed. However, when the electromagnet LM is energized to attract its armature 270, the bail 274 is pulled downwardly so that the downward projection 276 on the selector slides will clear the cross portion of the bail, thereby permitting normal operation of the key levers.

Referring to Figs. 10, 10A and 10B, it will be noted that each machine also includes two relays BR and CR, which may be of the usual telephone type mounted within the machine frame. Relay CR is for controlling operation of the machine, and relay BR is provided for preventing operation of the machine when another machine selected by the push keys is in use. An indicating lamp L is also provided for indicating when a selected machine is in use.

In the system shown in Figs. 10, 10A and 10B, machine B (Fig. 10A) is shown as having been conditioned for sending a message to machine C (Fig. 10B). In setting up this condition at machine B, the "send-receive" switch was in its "receive" position at the time the key C at machine B was depressed. At each machine, one side of the winding of relay BR is connected through a rectifier unit 279 to wire W7, and with the switch in its "receive" position and key C depressed, the other side of relay BR is connected through contacts 236—238 and contacts 280—281 closed by key C to wire WC. If machine C were being operated, the switch would be in the "send" position at that machine, thereby connecting the direct current power from rectifier DC across wires W7 and WC over a circuit from the minus side of rectifier DC through contacts 243—244 of the switch in its "send" position and through contacts 282—283 of relay BR to wire WC and the plus side of the rectifier DC being connected permanently to wire W7. Under this condition when the operator at machine B pushed key C with the "send-receive" switch at machine B in its "receive" position, relay BR at machine B will become energized because the "send-receive" switch at machine C is in its "send" position, and the energization of relay BR will close contacts 284—285 to energize the busy indicating light L at machine B.

However, under the conditions illustrated in Figs. 10, 10A and 10B, machine C is not in use as indicated by the "send-receive" switch being in its "receive" position, and accordingly when the key C is depressed at machine B, relay BR does not become energized over wires W7 and WC due to open contacts 243—244 at machine C. Accordingly, the busy indicating light L does not become energized and the operator then moves the switch at machine B to its "send" position as illustrated. As previously mentioned, the switch in its "send" position prevents movement of the interlocking bar 209 thereby retaining the key C in its depressed position and prevents depression of any other of the keys.

One side of the winding of the control relay CR at each machine is connected directly to the plus side of the rectifier DC at that machine and the other side of the winding is connected through a rectifier unit 286 to wire 199 which, as previously mentioned, is connected to the associated one of wires WA to WJ or, for example, wire 199 is connected to wire WB at machine B and to WC at machine C. Thus, when the switch is moved to its "send" position at machine B, relay CR at that machine becomes energized due to the fact that the minus side of rectifier DC is connected to wire 199 through contacts 243—244 of this switch and through contacts 282—283 of relay BR deenergized. This energizes the operating motor 202 at machine B by closing contacts 287—288, and also energizes the key lever locking magnet LM by closing contacts 289—290. Relay CR is likewise energized at machine C from the DC supply at machine B due to the fact that the plus side of rectifier DC at machine B is connected to wire W7 which is connected permanently at each machine to one side of the winding of relay CR, the other side of the winding of relay CR at machine C being connected to wire WC and wire WC at machine B is connected through contacts 280—281 of the depressed key C at machine B, through contacts 236—237 of the switch in the "send" position, and through contacts 244—243 to the minus side of rectifier DC at machine B. With the relay CR at machines B and C both energized, the operating motors at both machines will be energized but the lock magnet LM at machine C will not be energized due to open contacts 239—240. Thus, the keyboard at machine B may be operated due to the energization of LM at that machine for sending a message to machine C, but the keyboard at machine C cannot be operated due to the fact that the lock magnet LM is deenergized at that machine.

It was previously described that the six pairs of selector contacts 75–80 were connected at each machine to the respective ones of the six translator magnets 90. This may be seen in Figs. 10, 10A and 10B wherein it will be noticed that contact 75—1 at each machine is connected to electromagnet 90—1, 75—2 is connected to electromagnet 90—2, and so forth. The corresponding six contacts 80—1 to 80—6 are all connected together at each machine and are in turn connected to wire W7 at each machine through a common contact arrangement shown as a pair of contacts 295—296 and a second pair of contacts 297—298. Both pairs of common contacts are operated simultaneously whenever any one or more of the selector contacts 75 are operated. A single pair of contacts could be used in place of the double pair shown in the drawing, the double contacts merely being shown as an expedient for increasing the life of the common circuit-controlling arrangement. A resistor 299 is shown connected across the pair of contacts 295—296, and a similar resistor 300 is shown connected across the other pair of common contacts 297—298. These resistors are for the purpose of evenly dividing the current flow through the two pairs of common contacts.

The specific arrangement in the present machine for operating the common contacts is shown particularly at the right in Fig. 2. The two movable contacts 295 and 297 are mounted on an arm 305 in the same manner that the contacts 75 are mounted on the contact arm 66. The arm 305 is provided with down-turned ears having holes receiving the shaft 68 and a screw 306 threaded into the arm 305 engages the shaft 68 and prevents turning movement of the arm with relation to the shaft. It was previously mentioned that when a selector slide 50 trips any one of the contact operating arms 66, the shaft 68 is turned through the arm 165. Accordingly, when any one of the contacts 75 is moved into engagement with the companion contact 80, the common contacts 295 and 297 will be moved into engagement with their respective stationary contacts 296 and 298. The stationary contacts 296 and 298 are mounted on the cross member 84 of the machine frame in the same manner as contacts 80.

Referring again to Figs. 10, 10A and 10B, it will be seen that the common contacts 295—296 and 297—298 connect all of the selector contacts 80 to wire 310 at each machine, and this wire 310 is connected to wire W7 as well as to the plus side of the DC rectifier at each machine.

At each machine it will be noted that the selector contacts 75 are connected to the associated ones of the translator magnets 90 at the same machine, and these contacts are also connected to the corresponding ones of the wires W1 to W6 so that all of the selector contacts and all of the translator magnets at all machines in the system are connected in multiple. In other words, selector contact 75—1 and magnet 90—1 at each machine is connected to the corresponding contact and magnet at all of the other machines in the system, contact 75—2 and magnet 90—2 at each machine is connected to the corresponding contacts and magnets at all of the rest of the machines, and so forth.

In transmitting messages from machine B to machine C, it will be noted that the direct current from the rectifier in machine B flows from the plus side of the rectifier through the common contacts 295—296 and 297—298, through the operated ones of selector contacts 75—80, through the associated translator magnets 90 and rectifier unit 200 to wire 199, and then back to the minus side of the rectifier unit through contacts 282—283 of relay BR and contacts 244—243 of the "send-receive" switch. Current likewise flows from the rectifier DR at machine B through the operated ones of contacts 75—80 over the associated wires W1 to W6, through the associated translator magnets 90 and rectifier 200 at machine C to wire 199 which at machine C is connected to wire WC, and then back to the minus side of the rectifier DC through contacts 280—281 and switch contacts 236—237 and 244—243. Accordingly, the operation of the keyboard at machine B to selectively operate contacts 75—80 will cause a printing operation through the selector mechanism at machine B as well as machine C, but will not cause printing operation at any other machine in the system inasmuch as key C is the only one depressed at machine B.

The system shown in Figs. 10, 10A and 10B, however, is not confined to the transmission of messages between two machines only. If, for example, at machine B the key A had been depressed simultaneously with the key C, wire WA would be connected in multiple with wire WB through the contacts operated by key A so that the messages in addition to going to machine C would have obviously gone to machine A as well. Thus, any one or all of the keys A to J at one machine may be simultaneously depressed to transmit messages to as many machines in the system as may be desired.

It will now be clear in the present system, whenever any machine is sending a message to another machine, the direct current energy at that machine sending the message is connected at one side to the wire W7 and at the other side to whichever ones of the wires WA to WJ that are concerned for transmission of the message. In other words, when machine B is sending a message to machine C, one side of the rectifier DC is connected to wire W7 and the other side is connected to both wires WB and WC. Thus, when at another machine not involved in the message transmission existing at any particular time, one attempts to set up such machine for sending a message to any one of the busy machines, the relay BR at such machine will immediately become energized, thereby lighting the busy indicator light L showing that a message cannot be transmitted to the busy machines. However, two other machines, neither of which is involved in an existing message transmission, may also be sending messages to each other.

The interlocking arrangement between the "send-receive" switch prevents operation of any one of the push switches except when the "send-receive" switch is in its "receive" position, and if the busy indicator light L is ignored and the operator moves the switch to the "send" position, the relay BR is held energized through its own contacts 284—285 in series with a resistor 312 so that the relay BR is retained in its energized position even though contacts 238—236 are opened by this movement of the switch. Under these conditions, a message cannot be transmitted by such machine even though the switch is in its "send" position because contacts 282—283 of the relay BR will be open.

It will thus be clear that the present system is so arranged that an operator cannot manipulate a machine to disrupt the normal operation of the system nor to inadvertently or intentionally receive a message not intended for his machine. At the completion of a message transmission between machines, as previously described, the operator merely returns the "send-receive" lever to "receive" position and the system is returned to normal condition. During this movement of the switch lever 230, it will be clear that the bell crank 255 will cause a releasing movement of the interlocking bar 216 to allow any one of the keys A to J which were depressed to be restored automatically to normal position. This arrangement prevents the operator from inadvertently leaving the push switches in their depressed position, when it is not intended to send a message to that particular machine. If it is desired to use any machine of the system for typing at that point only and without sending a message to another machine, the "send-receive" lever is merely placed in "send" position without first pressing any one of the keys A to J. The machine may then be operated for the sole purpose of printing at that machine only, and no other machine may be connected to receive the printed matter nor to send messages to that machine until the "send-receive" lever is returned to its "receive" position.

The rectifier units 200, 279 and 286 are provided to block series cross-currents in the present system. In other words, these rectifiers permit the normal flow of current in one direction only in each circuit but the current is prevented from flowing through two or more windings 90, for example, in series as the current would have to flow in the reverse direction through at least one of the rectifiers 200.

A system has thus been provided in accordance with the present invention wherein a number of machines may be interconnected in any desired manner to exchange written messages over a minimum number of circuits. In other words, there are six wires connecting all of the selector contacts and translator magnets in multiple throughout the system, and through the provision of one individual wire for each machine in the system selective intercommunication is provided. A seventh wire interconnecting all the machines is provided for interlocking purposes so that the total number of wires extending between machines in the system will in every instance be equal to seven, plus the total number of machines in the system.

While there has been shown and described and pointed out the fundamental novel features of the invention as applied to a single modification, it will be understood that the various omissions and substitutions and changes in the form and details of the device illustrated and in its operation may be made by those skilled in the art, without departing from the spirit of the invention.

What is claimed is:

1. In a power operated typewriting machine, the combination of a set of type bars, a power driven operating roll, selector members, links connected to said type bars and cooperating with said roll and said selector members to operate one of said type bars during rotation of said roll, a plurality of permutatively notched translator slides disposed beneath said selector members, means constantly urging said selector members toward the notches of said translator slides, common means restraining movement of said selector members toward said translator slides, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively shifting said translator slides in a longitudinal direction to align the notches therein under one of said selector members, and means under the influence of said translator slides thereafter operative to shift said restraining means to permit a selector member to enter the aligned notches of said translator slides.

2. In a power operated typewriting machine, the combination of a set of type bars, a power driven operating roll, selector members, links connected to said type bars and cooperating with said roll and said selector members to operate one of said type bars during rotation of said roll, a plurality of permutatively notched translator slides disposed beneath said selector members, means constantly urging said selector members toward the notches of said translator slides, common means restraining movement of said selector members toward said translator slides, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively shifting said translator slides in a longitudinal direction to align the notches therein under one of said selector members, and means operative by the longitudinal movement of any one of said translator slides to shift said restraining means to permit a selector member to enter the aligned notches of said translator slides.

3. In a power operated typewriting machine, the combination of a set of type bars, a power driven operating roll, selector members, links connected to said type bars and cooperating with said roll and said selector members to operate one of said type bars during rotation of said roll, a plurality of permutatively notched translator slides disposed beneath said selector members, means constantly urging said selector members toward the notches of said translator slides, a rockable bail extending beneath said selector members and normally in contact therewith for restraining movement of said selector members toward said translator slides, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively shifting said translator slides in a longitudinal direction to align the notches therein under one of said selector members, and means operative by longitudinal movement of said translator slides to rock said bail out of contact with said selector members to permit a selector member to enter the aligned notches of said translator slides.

4. In a power operated typewriting machine, the combination of a set of type bars, a power driven operating roll, pivotally mounted selector members having free ends, links connected to said type bars and cooperating with said roll and said selector members to operate one of said type bars during rotation of said roll, a plurality of permutatively notched translator slides disposed beneath said selector members, a spring attached to the free end of each selector member constantly urging said selector members toward the notches of said translator slides, a rockable bail extending beneath said selector members and normally in contact therewith for restraining movement of said selector members toward said translator slides, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively shifting said translator slides in a longitudinal direction to align the notches therein under one of said selector members, and means under control of said translator slides thereafter operative to shift said bail out of contact with said selector members to permit a selector member to enter the aligned notches of said translator slides.

5. In a power operated typewriting machine, the combination of a set of type bars, a power driven operating roll, selector members, links connected to said type bars and cooperating with said roll and said selector members to operate one of said type bars during rotation of said roll, a plurality of permutatively notched translator slides disposed beneath said selector members, spring means constantly urging said selector members toward the notches of said translator slides, a bail restraining movement of said selector members toward said translator slides, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively shifting said translator slides in a longitudinal direction to align the notches therein under one of said selector members, and means under control of said translator slides thereafter operative to shift said bail to permit a selector member to enter the aligned notches of said translator slides.

6. In a power operated typewriting machine, the combination of a set of type bars, a power driven operating roll, selector members, links connected to said type bars and cooperating with said roll and said selector members to operate one of said type bars during rotation of said roll, a plurality of permutatively notched translator slides disposed beneath said selector members, spring means constantly urging said selector members toward the notches of said translator slides, a bail restraining movement of said selector members toward said translator slides, means latching each of said translator slides in one position, springs tending to move the respective translator slides into a second position to align the notches therein under one of said selector members, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively releasing said latching means, and means operative by the shifting movement of said translator slides under the influence of their respective springs to shift said bail to permit a selector member to enter the aligned notches of said translator slides.

7. In a power operated typewriting machine, the combination of a set of type bars, a power driven operating roll, pivotally mounted selector members having free ends, links connected to said type bars and cooperating with said roll and said selector members to operate one of said type bars during rotation of said roll, a plurality of permutatively notched translator slides disposed beneath said selector members, a spring attached to the free end of each selector member constantly urging said selector members toward the notches of said translator slides, a rockable bail extending beneath said selector members and normally in contact therewith for restraining movement of said selector members toward said translator slides, means for latching each of said translator slides in one position, springs tending to move the respective translator slides into a second position to align the notches therein under one of said selector members, a plurality of permutatively notched selector slides, key levers associated with said selector slides and each engageable with a notch in one or more of said selector slides to shift said selector slides selectively in a longitudinal direction upon depression of a key lever, means responsive to shifting movement of said selector slides for selectively releasing said latching means, and means operative by the shifting movement of any one of said translator slides under the influence of their respective springs to rock said bail to permit a selector member to enter the aligned notches of said translator slides.

References Cited in the file of this patent

UNITED STATES PATENTS

| Number | Name | Date |
|---|---|---|
| 2,247,275 | Buckley | June 29, 1941 |
| 2,255,011 | Lake et al. | Sept. 2, 1941 |
| 2,315,723 | Mills et al. | Apr. 6, 1943 |